United States Patent
Deurenberg et al.

(10) Patent No.: US 8,324,833 B2
(45) Date of Patent: Dec. 4, 2012

(54) LIGHT COLOR TUNABILITY

(75) Inventors: Peter H. F. Deurenberg, S-Hertogenbosch (NL); Cornelis J. P. M. Rooijackers, Waalre (NL)

(73) Assignee: NXP B.V., Eindhoven (NL)

( * ) Notice: Subject to any disclaimer, the term of this patent is extended or adjusted under 35 U.S.C. 154(b) by 176 days.

(21) Appl. No.: 12/865,819

(22) PCT Filed: Feb. 2, 2009

(86) PCT No.: PCT/IB2009/050398
§ 371 (c)(1),
(2), (4) Date: Aug. 2, 2010

(87) PCT Pub. No.: WO2009/098625
PCT Pub. Date: Aug. 13, 2009

(65) Prior Publication Data
US 2011/0001440 A1 Jan. 6, 2011

(30) Foreign Application Priority Data
Feb. 6, 2008 (EP) .................................. 08101306

(51) Int. Cl.
*H05B 37/02* (2006.01)
(52) U.S. Cl. ............. 315/291; 315/241 R; 315/209 R; 315/313
(58) Field of Classification Search ......... 315/209 R, 315/227 R, 240, 246, 291, 292, 294, 307, 315/308, 312, 313, DIG. 4
See application file for complete search history.

(56) References Cited

U.S. PATENT DOCUMENTS

| 4,675,721 | A | 6/1987 | Dirr |
| 5,803,579 | A | 9/1998 | Turnbull et al. |
| 6,528,954 | B1 | 3/2003 | Lys et al. |
| 7,352,138 | B2 * | 4/2008 | Lys et al. ................. 315/291 |
| 7,459,860 | B2 * | 12/2008 | Masuda et al. ............ 315/169.3 |
| 7,791,289 | B2 | 9/2010 | Oosterbaan et al. |
| 7,852,017 | B1 * | 12/2010 | Melanson ................ 315/291 |
| 2004/0085030 | A1 | 5/2004 | Laflamme et al. |
| 2005/0253533 | A1 | 11/2005 | Lys et al. |
| 2006/0208667 | A1 | 9/2006 | Lys et al. |
| 2008/0203936 | A1 | 8/2008 | Mariyama et al. |
| 2008/0224631 | A1 | 9/2008 | Melanson |
| 2011/0050122 | A1 | 3/2011 | Oosterbaan et al. |

FOREIGN PATENT DOCUMENTS

| CN | 1989792 A | 6/2007 |
| EP | 1176855 A2 | 1/2002 |
| WO | 0173818 A1 | 10/2001 |
| WO | 2005/115058 A1 | 12/2005 |
| WO | 2006/011092 A1 | 2/2006 |
| WO | 2006/018604 A1 | 2/2006 |

OTHER PUBLICATIONS

ST Microelectronics; "L6382D Power management unit for microcontrolled ballast" 22 pages; (Mar. 2007).
International Search Report and Written Opinion for application PCT/IB2009/050398 (Feb. 2, 2009).

* cited by examiner

*Primary Examiner* — James H Cho

(57) ABSTRACT

The application relates to setting color point and light intensity. By controlling the phase as well as the amplitudes of a driving voltage for a lighting device, the color point as well as the light intensity of a lighting device may be set.

29 Claims, 4 Drawing Sheets

LIGHT COLOR TUNABILITY

TECHNICAL FIELD

The present patent application relates to the tunability of a light color point using a driving voltage of a lighting device.

BACKGROUND

Existing dimmers use the common power line to provide dimming information to the light source by cutting the phase. These so-called phase cut dimmers can be used to dim existing halogen or incandescent light bulbs and in the future also LED based light sources. With the rise of LEDs in general lighting, there exists the need to also adjust the color point, color per se and/or color temperature, of the light emitted by the LED light sources. For example from U.S. Pat. No. 5,803,579, already discloses a tunable LED light source, where the color temperature of the LED light source can be adjusted. The proposed solution uses the mains power line to communicate the color temperature information from the user interface, i.e. a switch or dimmer, to the LED. For transferring this information, digital information is modulated onto the power line according to a proprietary protocol. Furthermore, the communication is a serial communication, where the information is transmitted over the power line from the control point, i.e. the light switch, to the lamp bulb in a serial fashion.

The known solution has the disadvantage that the digital communication requires each lamp to be configured with a dip-switch, in order to know, whether it is addressed or not. Further, the proprietary lamp driver will not work with a common phase cut dimmer. Consequently, this requires that both the lamp and the dimmer need to be replaced at the same time. Furthermore, the serially controlled LED light sources will not work with existing phase cut dimmers.

Therefore, there is a need for a compatible solution for setting the color point of a lighting device. There is further the need for providing the possibility to provide dimming of light intensity while also setting the color point information using the common driving voltage, i.e. the power line.

SUMMARY

In order to provide such a solution, the application provides a component comprising an input for receiving input power from a power supply, an output for supplying a voltage for driving a lighting device, and amplitude control means for adjusting the amplitude of the driving voltage in accordance with light color point information.

It has been found that the driving voltage in general has a sinusoidal waveform, e.g. a harmonic wave, and that the amplitude of this waveform can be used to transmit the color point information. Color point information can be understood as the color per se, e.g. RGB, YUV, color space coordinates, and/or the color temperature of a light device. The amplitude can be understood as the maximum voltage of the waveform in either or both the positive half or the negative half of the waveform. It has been found that the color point information can be transmitted over the existing infrastructure by adjusting the amplitude of the driving voltage. This may allow transmitting the color point information to the lighting device within the driving voltage. The lamp will work with any kind of phase cut dimmer. The lamp may be a LED lamp. The phase cut dimmer may be both triac and transistor based. Commonly known dimmers will still work with the lighting devices, without the possibility of setting the color point.

In order to allow both setting the color point as well as the light intensity, embodiments provide a phase control means for adjusting the phase of the driving voltage in accordance with light intensity information. Thus, the component allows for setting both the color point as well as the light intensity of the lighting device, i.e. the LED, connected to the common power supply. It is, however, also possible that the light intensity information is transmitted digitally from the user interface to the lighting device, as well as via the phase cut information. This may provide better resolution and reduced noise susceptibility compared to the phase cut information.

The amplitude control means can adjust the amplitude of the positive half wave and/or the amplitude of the negative half wave of the driving voltage in accordance with the color point information. For example, it may be possible to only adjust the amplitude of the positive half wave in accordance with the color point information, and leave the amplitude of the negative half wave unchanged. It is also possible, to only change the amplitude of the negative half wave or to change the amplitudes of both half waves.

The adjustment of the amplitudes of the half waves may, according to embodiments, be obtained by reducing their amplitudes, according to embodiments. The amplitudes may be reduced by a small amount. However, the reduction in amplitude may be detected in the lighting device, or the driver of the lighting device, upon which the color point may be set by the driver accordingly.

For example, embodiments provide for transmitting the color point information using the difference between the amplitudes of the positive and the negative half waves of the driving voltage. The amplitude control means can adjust the amplitude of the driving voltage such that a difference between the absolute value of a high level and the absolute value of a low level of the driving voltage is in accordance with the color point information, according to embodiments. The, even small, difference in the amplitudes between both halves of the driving voltage, which can be the positive and negative half waves of a sine wave, can be used to transmit the information of the color point to the lamp.

Embodiments provide the amplitude control means such that they adjust the amplitude of the driving voltage such that a difference between the positive half wave amplitude and the negative half wave amplitude is in accordance with the color point information.

It may be necessary that the power drawn from the lighting device during the positive and the negative half wave is balanced over time. Some countries require such regulation. In order to provide such a balance between the drawn power, embodiments provide the amplitude control means such that they alternate the half wave of the driving voltage within which the amplitude is adjusted, i.e. reduced or increased. It may also be possible, to alternate both half waves within one period equally, and to detect changes of amplitudes between consecutive periods.

In order to provide for enough power to drive the lighting device, while still enabling the transmission of color point information, embodiments provide the amplitude control means such that the reduction of amplitude of at least one half wave of the driving voltage is between 1% and 10% of the maximum amplitude of each half wave.

The color point information may be digital information. In order to transmit this digital information, the amplitude control means can modulate digital information for setting the light color point information of the lighting device onto the amplitude of the driving voltage.

Besides setting the color point of the lighting device, dimming the light intensity may also be accomplished. This may, according to embodiments, be provided with phase control means. The phase control means may provide modulating the phase of at least one half wave of the driving voltage in accordance with the light intensity information.

For example, the phase control means may provide modulating the phase of at least one half wave of the driving voltage by cutting off the signal in at least one half wave of the output voltage. Cutting off the signal in at least one half wave of the output voltage may be provided, by cutting off parts of a half wave and pulling the voltage down to approximately 0 Volt at the cutting point. At the end of the half cycle, the other half wave of the driving voltage can be applied as usual. It may also be possible, to cut off the voltage of a half wave or both half waves within any time period of the half wave. The length of the cut off period may be used for setting the light intensity. There may be two types of phase cut dimmers: leading edge and trailing edge dimmers. Leading edge dimmers may cut the phase at the start of half the period, trailing edge dimmers may cut the phase at the end of half the period.

In order to set the color point as well as the light intensity, embodiments provide input means for receiving user input of this information. The input means may, for example, be buttons, for example push buttons. For example, a potentiometer may be used alternatively between selecting the color point and the light intensity. According to another embodiment, two potentiometers might be used as input means, wherein one potentiometer may be used for setting the color point and the other potentiometer may be used for setting the light intensity. Another input means may be a panel with 5 push buttons. One pair may be used for up down selecting the color point, another pair may be used for selecting the intensity, and the last button may be used for on/off. Other user interfaces may, however, be also possible. The potentiometers used in the user interfaces may, for example, be optical potentiometers. The optical turning devices may use LEDs, photodiodes and/or holes under the turning button.

According to embodiments, the component may further comprise a storage means for storing the user input light intensity information and/or the user input color point information, which may be used for setting the amplitude and/or the phase.

According to a further aspect of the application, there is provided a component comprising a driver for driving a lighting device, an input for receiving a driving voltage for driving the lighting device, and amplitude determination means for determining the amplitude of the driving voltage and setting the driver to set the color point of the lighting device accordingly. The driver for driving the lighting device may be adjusted for driving an LED. It may, however, also be a circuit for driving a halogen lamp, or any other circuit suitable for driving a lighting device. The driving voltage may, for example, be a sinusoidal driving voltage, having a sinus wave or any other kind of harmonic wave. The driving voltage may also be in the form of a rectified wave form as well as in the form of a pulsed DC voltage. The amplitude determination means may be arranged for determining the amplitude of the driving voltage, which was previously adjusted by the amplitude control means. By determining the amplitude, it may be possible to set the driver such that it sets the light color point of the lighting device according to the information within the amplitude. The amplitude determination means may be suitable for determining a change in the amplitude, i.e. between the positive and the negative half wave, which may be mapped onto color point information to set the driver accordingly.

According to embodiments, the component may further comprise phase determination means for determining the phase of the driving voltage and setting the driver to set the light intensity of the lighting device accordingly. The phase determination means may be arranged to detect a phase cut within the half waves. This phase cut may be suitable to determine a light intensity.

The amplitude determination means may determine the amplitude of the positive half wave and/or the amplitude of the negative half wave of the driving voltage, according to embodiments. Either the positive half wave or the negative half wave, or both, may be altered in their amplitude in order to transmit the color point information.

The amplitude determination means may be arranged for determining a reduction of at least one of the amplitude of the positive half wave or the negative half wave of the driving voltage. It may also be possible to determine an increase of at least one half wave. Further, it may be possible to determine a reduction or increase of one half wave over the other half wave in absolute value.

The amplitude determination means may determine a difference between the absolute values of a high level and the absolute value of a low level of the driving voltage, according to embodiments.

According to further embodiments, the amplitude determination means determine a difference between the positive half wave amplitude and the negative half wave amplitude of the driving voltage. A difference between the amplitudes of the positive and negative half waves may be interpreted as a change in color point, which may be used to set the driver accordingly.

In order to set the light intensity of the lighting device, the driver needs to know the light intensity information. Embodiments provide phase determination means, which determine the phase of at least one half wave of the driving voltage. Determining the phase may not only be understood as determining temporal information from the driving signal, but also determining cut off phases in the driving signal.

For that reason, embodiments provide phase determination means, which determine a cut off phase of at least one half wave of the output voltage. Determining the cut off phase may be understood as determining a time period, within which a positive or a negative half wave is cut off. Also, determining the cut off phase may be understood as determining the time period, within which a positive and/or negative half wave deviates from the expected slope, e.g. is 0 Volt, whereas expected to be different than 0 Volt.

In order to set the color point, the lighting device may be comprised of LEDs with different colors. For example, a lighting device may be comprised of at least one LED with warm white color and one LED with cool white color. Selecting a combination of warm white and cool white LEDs within the lighting device may determine the color temperature. It may also be possible that a combination of LEDs with amber and white color may be used within one lighting device, which may be selectively activated depending on the color point information. Also, lighting devices with at least three LEDs, each representing a different color, for example RGB, may be used. Selecting any two of these LEDs may allow adjusting a different color. Also, arrays of a plurality of colored LEDs may be used in a lighting device, where the color point information determines, which one or set of LEDs is activated and which one or set of LEDs is deactivated, in order to set the color point.

The driving voltage may be polluted with noise. In order to suppress this noise, i.e. not to allow the noise to set the color point, i.e. the noise may alter the amplitudes of the half waves, embodiments provides a hysteresis for determining the amplitude of the driving voltage. The hysteresis may suppress the supply voltage noise. The hysteresis may, however, lengthen the reaction times of the component.

In order to decrease the response time when the color point is actually set, embodiments provide for an adaptive hysteresis. It may be possible that the hysteresis band is large when the color point is not being changed, and that when a change of the color point is being detected, i.e. by a change of amplitude, the hysteresis band is decreased, in order to allow a change in the color point more quickly.

Further, to suppress noise in the driving voltage, embodiments provide applying a low pass filter onto the driving voltage.

A further aspect of the application is an integrated circuit with a previously described component for adjusting the driving voltage as well as for setting the driver.

A system with the previously described component and lighting devices is another aspect of the application.

A further aspect of the application relates to a method comprising receiving input power from a power supply, putting out a driving voltage for driving a lighting device, and adjusting the amplitude of the driving voltage in accordance with color point information.

Another aspect of the application is the method comprising receiving a driving voltage for driving a lighting device, and determining the amplitude of the driving voltage and driving the color point of the lighting device accordingly.

Yet, another aspect of the application is a method comprising receiving input power from a power supply, supplying a driving voltage for driving a lighting device, adjusting the amplitude of the driving voltage in accordance with light color point information, receiving the driving voltage for driving the lighting device, and determining the amplitude of the driving voltage and driving the light color point of the lighting device accordingly.

Another aspect of the application is a computer program comprising instructions operable to cause a processor to configure a described system to receive input power from a power supply, supplying a driving voltage for driving a lighting device, and adjust the amplitude of the driving voltage in accordance with light color point information.

A further aspect of the application is a computer program comprising instructions operable to cause a processor to configure a described system to receive a driving voltage for driving a lighting device, and determine the amplitude of the driving voltage and drive the light color point of the lighting device accordingly.

These and other aspects of the application will be apparent from and elucidated with reference to the following Figures. In the Figures shown:

DETAILED DESCRIPTION OF THE FIGURES

The Figures show schematically the components and systems suitable for carrying out the methods according to embodiments. It is to be understood that all elements and method steps can be implemented as microprocessors and/or software.

Figure 1:
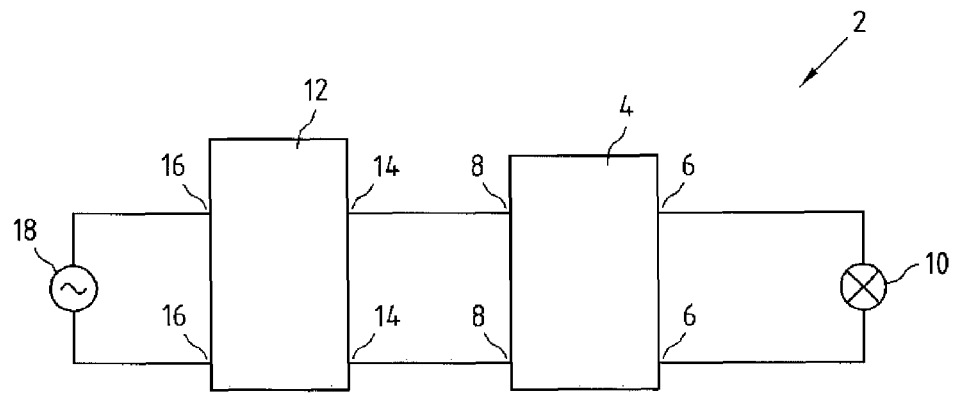
FIG. 1 schematically a block diagram of a system according to the application.

FIG. 1 illustrates a system 2 for setting color point information and light intensity information and for using this information for driving a lighting device 10.

Illustrated is a component 4 for receiving color point information and light intensity information and for driving a lighting device 10 accordingly. Component 4 has output terminals 6 and input terminals 8. Input terminals 8 are used for receiving a driving voltage. Output terminals 6 are used for supplying the lighting device 10 with lighting power for driving the lighting device 10. For example, driving an LED requires a driving current and driving an incandescent light bulb requires a driving voltage. Component 4 may be implemented as an integrated circuit, or as separate elements. Component 4 may be implemented in hardware and partially software.

Further illustrated in FIG. 1 is a component 12. Component 12 is arranged for receiving input power and supplying a driving voltage to component 4, where the driving voltage carries information according to the color point information and light intensity information. Component 12 has output terminals 14 and input terminals 16. Output terminals 14 are arranged for supplying a driving voltage to component 4. Output terminals 14 supply a driving voltage, whose amplitude is in accordance with color point information and whose phase is in accordance with light intensity information. Component 12 may be implemented as an integrated circuit, or as separate elements. Component 12 may be implemented in hardware and software.

Input terminals 16 are connected to a power supply 18 for receiving operation power. Power supply 18 may be an AC power source, for example a 230 volt or a 110 volt power supply.

System 2 is arranged for setting the amplitude of a driving voltage output by output terminals 14 in accordance with color point information and setting the phase of the driving voltage output at output terminals 14 in accordance with light intensity information. Further, the driving voltage is utilized by component 4 in order to drive lighting device 10. Lighting device 10 may be an LED, a set of LEDs, an array of LEDs, or any other lighting device suitable of generating light at different intensity and different color points.

Figure 2:
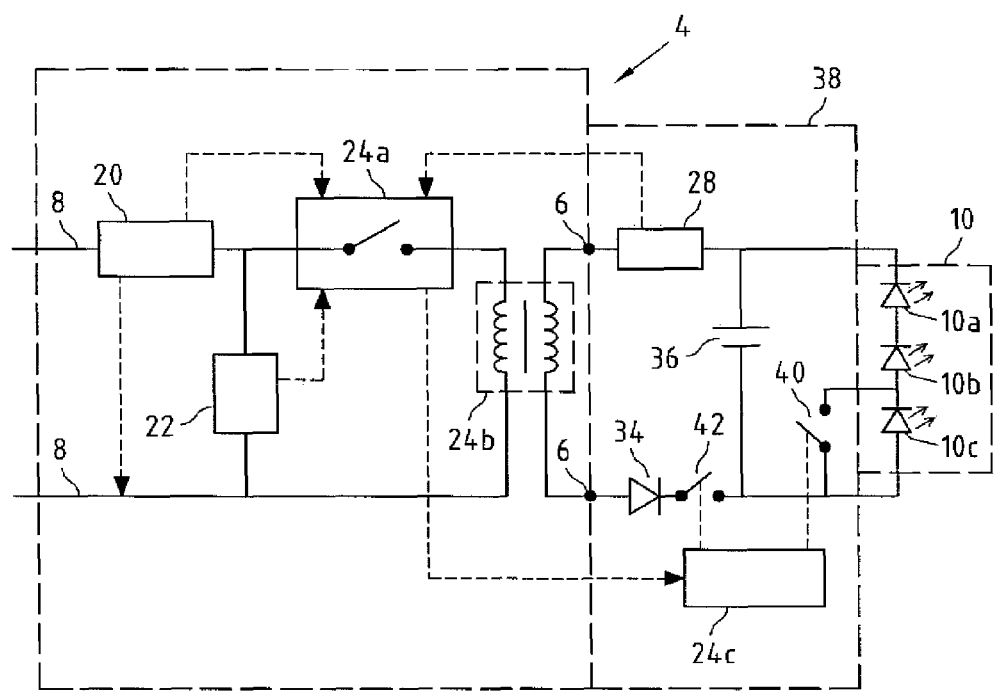
FIG. 2 schematically a block diagram of a component for adjusting the amplitude of the driving voltage in accordance with color point information.

FIG. 2 illustrates in more detail a component 4. It has to be noted that the galvanic decoupling provided within component 4 of FIG. 2 is one possible option for implementing component 4. It may also be possible to provide component 4 with at least one direct buck converter: In this case; there is not galvanic separation between terminals 6 and 8. Please note that the implementation illustrated in FIG. 2 is one of a multitude of possible examples.

Illustrated are input terminals 8, and output terminals 6. Further illustrated in FIG. 2 is an arrangement 38, which may form a part of component 4, as well as being separated from component 4. Further illustrated in FIG. 2 is a lighting device 10, comprising of a plurality of LEDs 10a, 10b, 10c.

Component 4 comprises amplitude determination means 20, phase determination means 22, and driver 24.

Via input terminals 8, a driving voltage is received within component 4. Amplitude determination means 20 determines the amplitude of the driving voltage. Phase determination means 22 determines the phase of the driving voltage. The determined amplitude and phase are provided to driver 24.

Driver 24 is comprised of a controller 24a, a transformator 24b, and a power management unit 24c. In order to set the light intensity, the power through lighting device 10 needs to be adjusted. This may be done by sensing with a sensor 28 the voltage and/or current within the circuit for driving lighting device 10, and feeding back the sensed voltage/current via an opto-coupler to controller 24a. Depending on the sensed voltage/current, controller 24a may adjust the appliance of current to transformator 24b in accordance with light intensity information received from phase determination means 22. This may be done by using a pulse width modulation of the primary side current applied to transformator 24b, in order to adjust the secondary side voltage and current of the circuit feeding lighting device 10.

Light intensity may further be set by feeding power management unit 24c through an opto-coupler with light intensity information. Upon receiving light intensity information, power management unit 24c can control switch 42 for switching the voltage applied to lighting device 10.

In order to control the color point of lighting device 10, controller 24a may feed power management unit 24c with light color point information. Depending on the color point information, power management unit 24c may switch on and off switch 40. By switching on and off switch 40, LED 10c may be switched on/off. For example, when LEDs 10a, 10b are LEDs having amber color and LED 10c has a cool white color, closing switch 40 would result in a warmer light emitted by lighting device 10, as LED 10c is short circuited by switch 40 and does not emit light. When switch 40 is open, LED 10c emits besides LEDs 10a, 10b light and the overall light emitted by lighting device 10 is cooler, i.e. has a higher color temperature. It may be possible that switch 40 may be arranged as a plurality of switches for switching on and off any of LEDs 10a, 10b, 10c. For example, when LED 10a has red color, LED 10b has green color and LED 10c has blue color, switching any combination of these LEDs allows for providing light in any color, which may be set via power management unit 24c in accordance with light color point information received from controller 24a. In order to commutate the current within arrangement 38, there is provided a diode 34. Diode 34 commutates the current within component 38, and prevents LEDs 10a, 10b. 10c from being reverse biased.

In order to reduce noise in the current in arrangement 38, there is provided capacitor 36. Capacitor 36 may act as low-pass filter.

Figure 3:
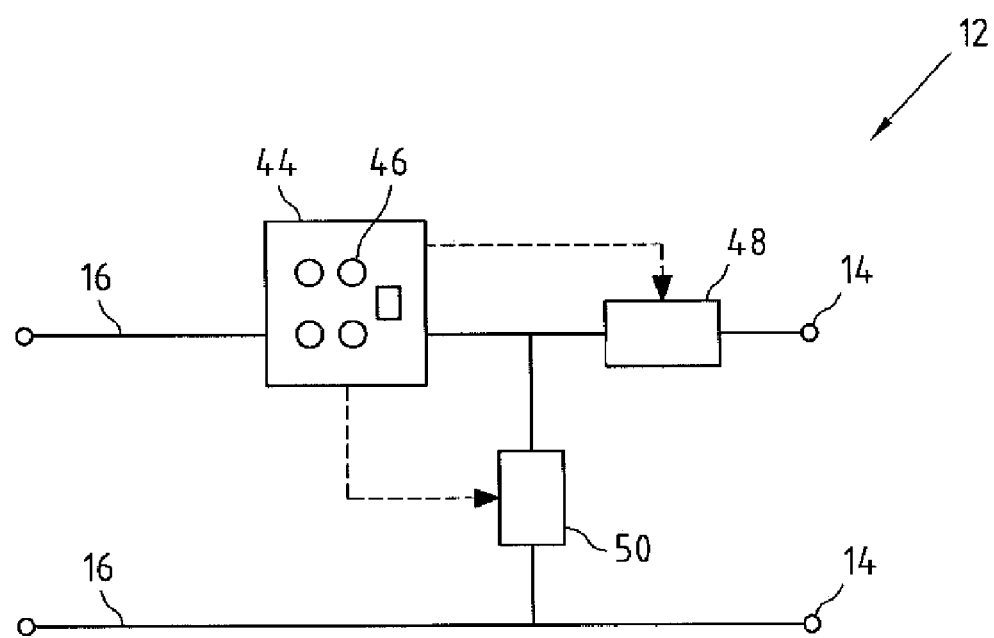
FIG. 3 schematically a block diagram of a component for setting a driver of a lighting device to set the color point of the lighting device.

FIG. 3 illustrates component 12. Component 12 may comprise an input panel 44, an amplitude control means 48, and a phase control means 50. Input panel 44 may comprise a plurality of user buttons 46. For example, a set of two buttons 46 may be used for adjusting the color point. For adjusting the color point, the amplitude of the driving voltage is controlled by amplitude control means 48. As a further example, a set of two other user buttons 46 may be used for setting the light intensity. This information may be fed to phase control means 50, which adjusts the phase of driving voltage being output at output terminals 14. A further button 46 may be use for switching on and off the driving voltage being supplied at output terminals 14.

Figure 4:
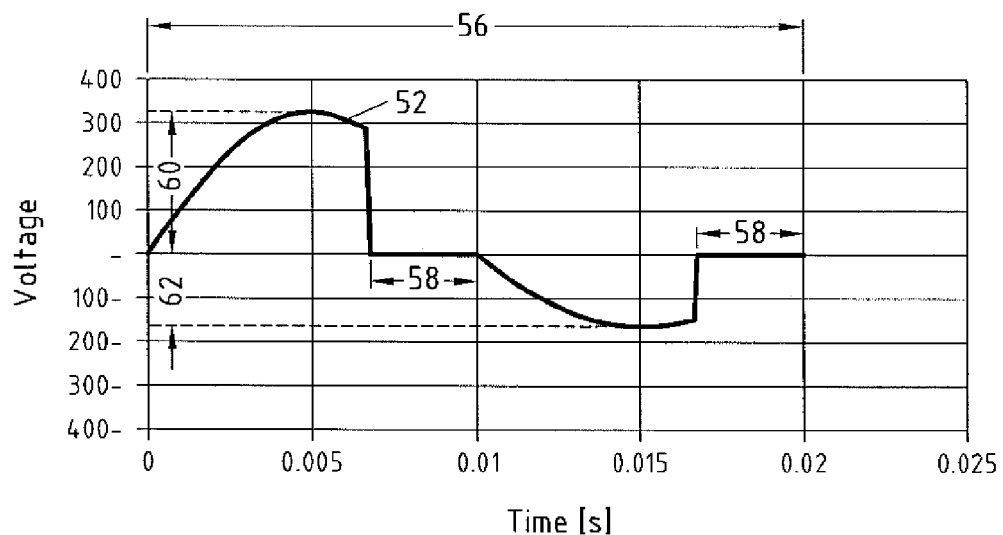
FIG. 4 a graph indicating a waveform of a signal for providing color point information and light intensity information.
Figure 5:
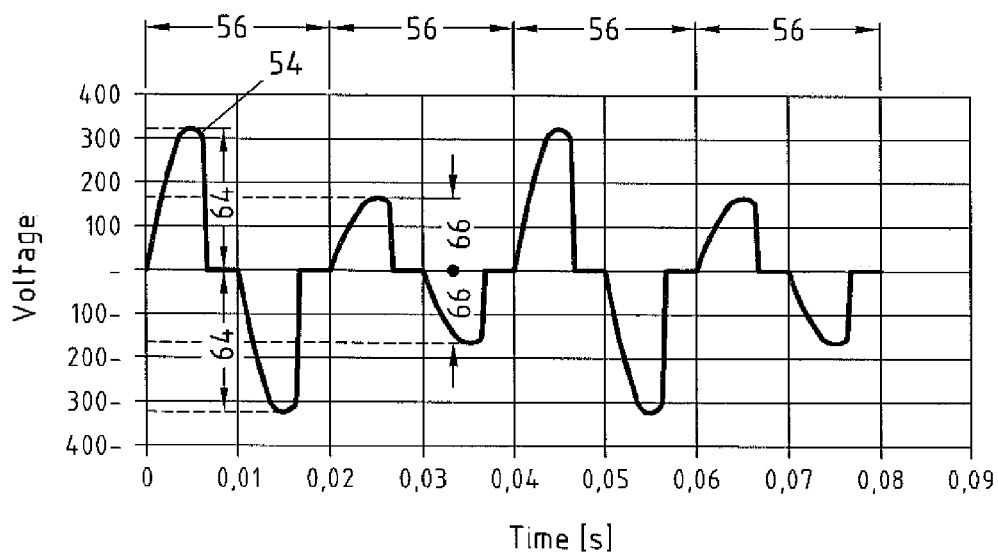
FIG. 5 a further graph of a signal indicating color point information and light intensity information.

The adjustment of amplitude and phase with an amplitude control means 48 and phase control means 50 is further illustrated in FIGS. 4 and 5.

FIG. 4 illustrates a possible arrangement 52 of the supply voltage on terminals 14 during one period 56. The duration of positive half wave is 0.01 seconds and the duration of the negative half wave is also 0.01 seconds, thus the period 56 is 0.02 seconds, i.e. a frequency of 50 Hz. As can be seen, the amplitude 60 of the positive half wave is approx 325 Volt, whereas the amplitude 62 of the negative half wave is approx 180 Volt. The color point information may be coded within the amplitudes 60, 62. For example, the difference between amplitude 60 and amplitude 62 may be used for coding the color point information. It may also be possible, to code the color point information in the two values of the amplitude 60 and the amplitude 62. The amplitudes 60, 62 may thus be utilized to transmit color point information within the driving voltage.

In order to set the light intensity, the arrangement 52 of the driving voltage shows phase cut characteristics. As can be seen, the positive half wave is cut during time 58, and the negative half wave is cut during time 58. The two half waves are cut approx ⅓ of their duration. The phase cut in times 58 provides for light intensity information within the driving voltage.

The amplitude control means 48 sets the amplitude 60, 62, in order to transmit color point information within the driving voltage. The phase control means 50 adjust the phase cut 58 out of the positive and negative half waves of driving voltage and thus provides for light intensity information.

Amplitude determination means determine the amplitude 60, 62 and allow for adjusting the color point of lighting device 10. Phase determination means 22 determine the phase cut times 58 in order to set the light intensity of lighting device 10.

It should be noted that an arrangement according to FIG. 5 may cause component 4 to be unable to determine, which is the amplitude and which is the color point information. It may be possible to transmit the amplitude information twice and to transmit the color point information once, or vice versa.

For example, when two sets of information, i.e. A, and B, are sent to component 4, in order to "understand these signals, component 4 needs to be synchronized to the data send. If A and B are send alternatively, e.g. in digital format, an unsynchronized receiving part could swap the info. This can for instance be solved by sending the info like: A, A, B.

More generally, digital information (zero and ones) can be encoded by means of the amplitude of the sine wave. Simultaneously, mains distortions can also change the mains amplitude levels. To robustly distinguish between zero and 1, some error decoding algorithm can be added to the communication. For example: parity bits, or more complex error detection and correction circuits like present in a CD player may be introduced into the information coded as phase and amplitude of the transmitted signal.

Setting the amplitudes is also possible, where the positive and the negative half waves within each period 56 have the same amplitude, however, two consecutive periods show different amplitudes. As is illustrated in FIG. 5, in a first period 56, the arrangement 54 of the driving voltage has amplitude 64. In the following period 56, the arrangement 54 has an amplitude 66, being smaller than amplitude 64. The difference in these amplitudes may be utilized to transmit color point information within the driving voltage.

Additionally, it may be beneficial to send the amplitude (light level) information digitally as well as by means of the phase information. The digital version may for instance allow additional resolution and serve as a forward compatibility for future products, which might not use the phase info anymore.

Figure 6:
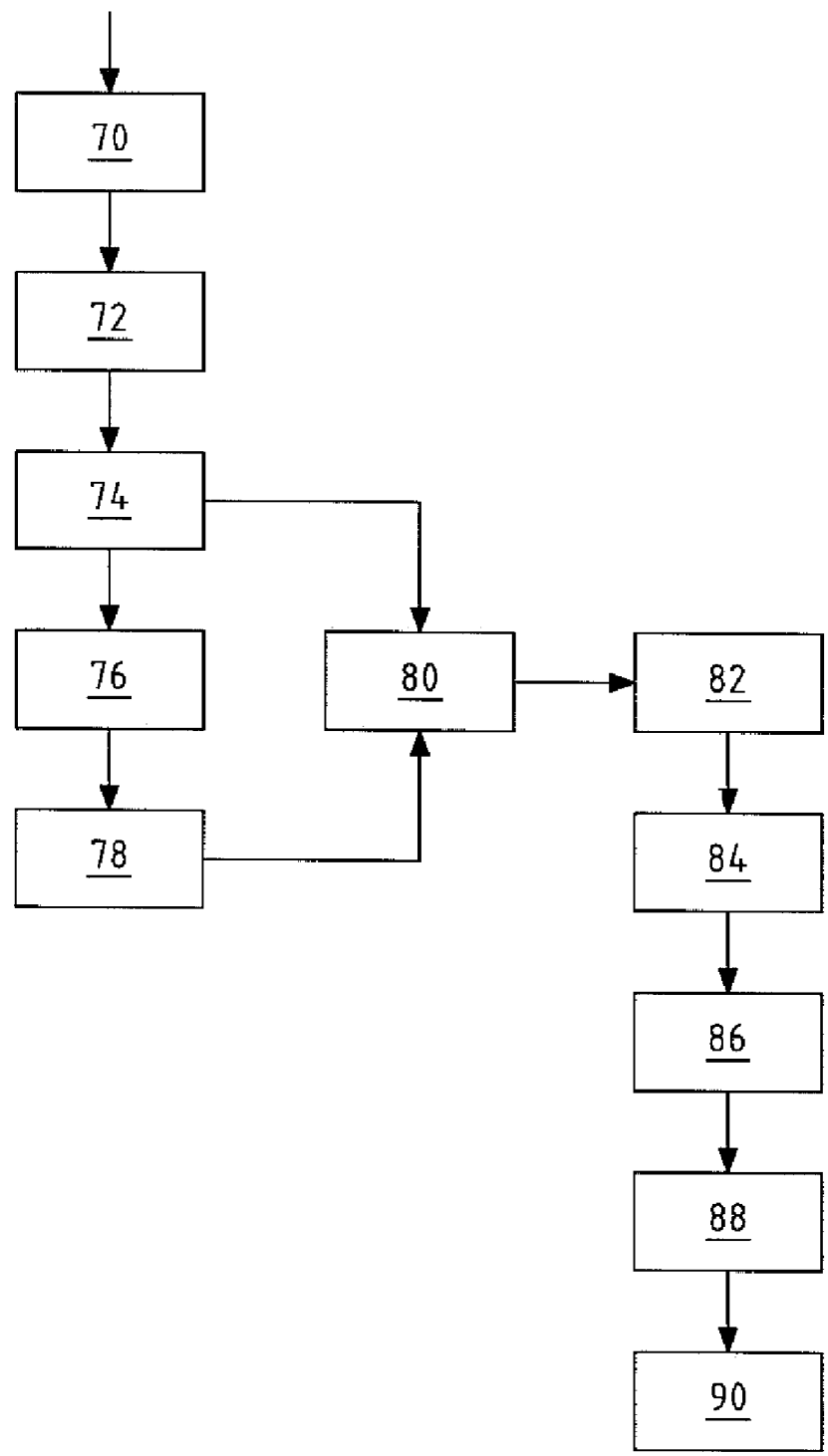
FIG. 6 a flow chart of a system according to a specification.

FIG. 6 illustrates a flow chart of a system 2. When switching system 2 on through user panel 44, the supply power (mains voltage) applied to input terminals 8 is adjusted according to user selections through user buttons 46 in a first step 70. First, user selection for color point is determined 72. The determined color point information is used to control 74 amplitude control means 50. Further, user input corresponding to the desired light intensity is determined 76, and phase control means 50 are adjusted 78.

Adjusting 78 amplitude control means 48, and phase control means 50 results in outputting 80 a driving voltage at output terminals 14. The driving voltage may have an arrangement 54, as illustrated in FIG. 4 and FIG. 5. Depending on the color point information received from user terminal 44, the amplitudes 60, 62, 64, 66 of output voltage are varied. Depending on light intensity information received from input panel 44, the times 58 for phase cutting the arrangements 52 and 54 of driving voltage are adjusted. The modulated and phase cut driving voltage is received 82 at input terminals 8 of component 4. Amplitude determination means 20 determines 84 the amplitude of the driving voltage. Phase determination means 22 determines 86 the phase cut times 58 of driving voltage. Depending on the determined amplitude and phase, driver 24 is driven 88.

Driving 88 driver 24 according to the color point information and light intensity information result in outputting 90 light at lighting device 10, which has the desired light intensity and the desired light color point. Thus, the described method allows for setting the color point, as well as the light intensity. By adjusting the amplitudes of the driving voltage, and using phase cutting the driving voltage the described method allows for operating not only a lighting device 10 suitable for setting the light color point, but also commonly known lighting devices 10. Connecting commonly known lighting devices 10 to output terminals 6 may, however, result in setting the light intensity through controller 24a, and neglecting color point information. Using arrangement 38 allows for setting, besides the light intensity, also the color point according to user wishes.

The invention claimed is:

1. A component comprising:
an input for receiving input power from a power supply,
an output for supplying a driving voltage to a lighting device, and
amplitude control means for adjusting the amplitude of the driving voltage in accordance with color point information;
wherein the amplitude control means adjust the amplitude of the positive half wave and/or the amplitude of the negative half wave of the driving voltage in accordance with the color point information;
wherein the amplitude control means reduce the amplitude of at least one half wave of the driving voltage between 1% and 10% of the maximum amplitude.

2. The component of claim 1, further comprising phase control means for adjusting the phase of the driving voltage in accordance with light intensity information.

3. The component of claim 2, wherein the phase control means provide modulating the phase of at least one half wave of the driving voltage in accordance with the light intensity information.

4. The component of claim 2, wherein the phase control means provide modulating the phase of at least one half wave of the driving voltage by cutting off the signal in at least one half wave of the driving voltage.

5. The component of claim 2, further comprising storage means for storing the user input light intensity information and/or color point information.

6. The component of claim 1, wherein the amplitude control means reduce at least one of the amplitude of the positive half wave or the negative half wave of the driving voltage in accordance with the color point information.

7. The component of claim 1, wherein the amplitude control means adjust the amplitude of the driving voltage such that a difference between the absolute value of a high level and the absolute value of a low level is in accordance with the color point information.

8. The component of claim 1, wherein the amplitude control means adjust the amplitude of the driving voltage such that a difference between the positive half wave amplitude and the negative half wave amplitude is in accordance with the color point information.

9. The component of claim 1, wherein the amplitude control means alternate the half wave of the driving voltage which amplitude is reduced.

10. The component of claim 1, wherein the amplitude control means modulate digital information for setting the color point of the lighting device onto the amplitude of the driving voltage.

11. The component of claim 1, further comprising input means for receiving user input for setting the light intensity information and/or the color point information.

12. An Integrated circuit with a component selected from at least one of the following: a component of claim 1, a component of claim 5.

13. A component comprising:
a driver for driving a lighting device,
an input for receiving a driving voltage for driving the lighting device, and
amplitude determination means for determining the amplitude of the driving voltage and setting the driver to set the light color point of the lighting device accordingly;
further comprising phase determination means for determining the phase of the driving voltage and setting the driver to set the light intensity of the lighting device accordingly;
wherein the phase determination means determine a cut off phase of at least one half wave of the driving voltage.

14. The component of claim 13, wherein the amplitude determination means determine the amplitude of the positive half wave and/or the amplitude of the negative half wave of the driving voltage.

15. The component of claim 13, wherein the amplitude determination means determine a reduction of at least one of the amplitude of the positive half wave or the negative half wave of the driving voltage.

16. The component of claim 13, wherein the amplitude determination means determine a difference between the absolute value of a high level and the absolute value of a low level of the driving voltage.

17. The component of claim 16, wherein the amplitude determination means determine a difference between the positive half wave amplitude and the negative half wave amplitude of the driving voltage.

18. The component of claim 13, wherein the phase determination means determine the phase of at least one half wave of the driving voltage.

19. The component of claim 13, wherein the driver changes a power ratio between at least two lighting devices having different colors in accordance with the color point information from the amplitude determination means.

20. The component of claim 13, wherein the amplitude determination means apply a hysteresis for determining the amplitude of the driving voltage.

21. The component of claim 20, wherein the hysteresis band is larger when the amplitude of the driving voltage is stable than when the amplitude of the driving voltage is changed to adjust the color point.

22. The component of claim 13, wherein the amplitude determination means apply a low pass filter onto the driving voltage to suppress noise in the driving voltage.

23. A component comprising:
an input for receiving input power from a power supply,
an output for supplying a driving voltage to a lighting device, and
amplitude control means for adjusting the amplitude of the driving voltage in accordance with color point information;
wherein the amplitude control means adjust the amplitude of the driving voltage such that a difference between the absolute value of a high level and the absolute value of a low level is in accordance with the color point information.

24. A component comprising:
an input for receiving input power from a power supply,
an output for supplying a driving voltage to a lighting device, and
amplitude control means for adjusting the amplitude of the driving voltage in accordance with color point information;
wherein the amplitude control means adjust the amplitude of the driving voltage such that a difference between the positive half wave amplitude and the negative half wave amplitude is in accordance with the color point information.

25. A component comprising:
a driver for driving a lighting device,
an input for receiving a driving voltage for driving the lighting device, and
amplitude determination means for determining the amplitude of the driving voltage and setting the driver to set the light color point of the lighting device accordingly;
wherein the amplitude determination means determine a difference between the absolute value of a high level and the absolute value of a low level of the driving voltage.

26. The component of claim 25, wherein the amplitude determination means determine a difference between the positive half wave amplitude and the negative half wave amplitude of the driving voltage.

27. A component comprising:
a driver for driving a lighting device,
an input for receiving a driving voltage for driving the lighting device, and
amplitude determination means for determining the amplitude of the driving voltage and setting the driver to set the light color point of the lighting device accordingly;
wherein the driver changes a power ratio between at least two lighting devices having different colors in accordance with the color point information from the amplitude determination means.

28. A component comprising:
a driver for driving a lighting device,
an input for receiving a driving voltage for driving the lighting device, and
amplitude determination means for determining the amplitude of the driving voltage and setting the driver to set the light color point of the lighting device accordingly;
wherein the amplitude determination means apply a hysteresis for determining the amplitude of the driving voltage.

29. The component of claim 28, wherein the hysteresis band is larger when the amplitude of the driving voltage is stable than when the amplitude of the driving voltage is changed to adjust the color point.

* * * * *